INVENTOR.
STANLEY J. PEABODY

April 20, 1965    S. J. PEABODY    3,179,908
HEAT EXCHANGE MEANS FOR ELECTROMAGNETIC DEVICES
Filed Aug. 25, 1960    2 Sheets-Sheet 2

INVENTOR.
STANLEY J. PEABODY
BY
Wm. H. Dean

United States Patent Office

3,179,908
Patented Apr. 20, 1965

3,179,908
**HEAT EXCHANGE MEANS FOR ELECTRO-
MAGNETIC DEVICES**
Stanley J. Peabody, Phoenix, Ariz., assignor to EMP
Electronics, Inc., a corporation of Arizona
Filed Aug. 25, 1960, Ser. No. 51,930
4 Claims. (Cl. 336—61)

This invention relates to heat exchange means for electromagnetic devices and more particularly to a heat exchange means for removing heat from transformers, inductors or saturable reacters wound on toroidal coils.

Heating of such devices is caused by core and winding losses and the prior art teaches the removal of heat from external surfaces of the windings thereby permitting a substantial temperature rise in the interior of the windings and core structures. Consequently, prior art devices of this class have been relatively bulky or inefficient as compared to devices constructed in accordance with the present invention as will be hereinafter described.

Accordingly, it is an object of the invention to provide a heat exchange means for electromagnetic devices which very efficiently removes heat from the core and interwindings of toroidal and similar electromagnetic structures.

Another object of the invention is to provide means for the removal of heat from electromagnetic structures without making appreciably undesirable compromises with respect to the case, the winding or the window area of the core structures.

Another object of the invention is to improve the reliability of electromagnetic devices by reducing the thermal stresses on insulation and/or allowing the building of smaller, less efficient magnetic structures avoiding high internal temperature rises.

Another object of the invention is to provide a heat exchange means for electromagnetic devices having toroidal cores provided with contiguous heat exchange members around which windings are disposed whereby heat is conducted by the heat exchange members from a position between the windings and the core to an area or structure externally of the windings.

Another object of the invention is to provide a very simple and economical heat exchange means for toroidal electromagnetic devices which may be interposed between the core and the windings during the assembly and manufacture of such devices.

Another object of the invention is to provide a very simple and economical means for exchanging heat from the conventional core boxes of toroidal cores used in various electromagnetic devices.

Another object of the invention is to provide a heat exchange means for electromagnetic devices wherein strips of heat conducting material are interposed between the core and winding structures of such devices and project outwardly through the winding parallel to the strands of the winding whereby the winding may readily be wound around the core and the heat exchange means, while the heat conducting strips thereof project to an area beyond the ultimate extremities of the windings.

Another object of the invention is to provide a heat exchange means for electromagnetic devices which also serves as a convenient mount which serves as a simple means for transferring heat to suitable heat radiators or heat sinks.

Another object of the invention is to provide a very simple heat exchange means which efficiently exchanges heat from the centers of toroidal windings and which may be thermally coupled thereto by a mastic composed of plastic resin and metallic particles.

Other objects and advantages of the invention may be apparent from the following specification, appended claims and accompanying drawings in which:

Figure 1:
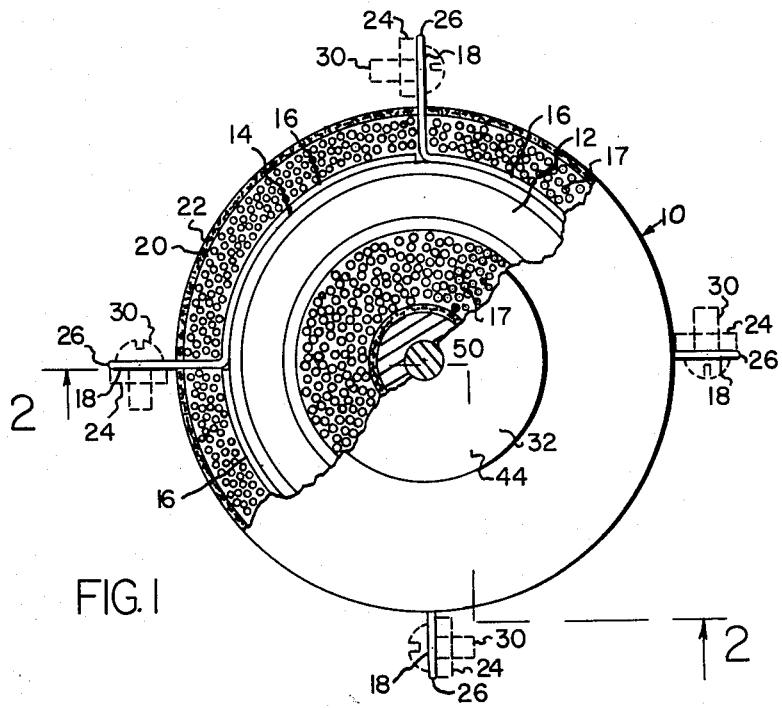
FIG. 1 is a side elevational view of a toroidal electromagnetic device showing portions thereof broken away and in section and showing the heat exchange means of the present invention disposed between the windings and the core of the electromagnetic device and extending to an area beyond the extremities of the windings.

As shown in FIG. 1 of the drawings, a toroidal transformer, inductor or saturable reactor 10 is provided with a toroidal or ring shaped core 12. This toroidal core 12 may be of conventional construction and contiguous to the outer surface 14 of the toroidal core are heat exchange strips 16. These strips 16 are preferably of aluminum, copper or any other non-magnetic material having good heat conducting characteristics. These strips 16 being contiguous with the outer surface of the core 12 are thermally coupled thereto and are held in intimate coupling by windings 17 which are wound radially and helically around the core 12 and the heat exchange strips 16. Thus, the strips are interposed between the winding and the core and are held in contiguous thermally conductive relationship therewith. These strips 16 are provided with radially extending portions 18 which project beyond the periphery or extremities 20 of the windings which are enclosed in a coating 22 of the resin or other suitable material.

It will be understood that the strips 16 having the radially projecting portions 18 are disposed to be coupled to thermally conductive elements shown by broken lines 24 which may also serve as mounts for the electromagnetic devices. The projecting portions 18 of the strips 16 are flat and have opposite sides; generally parallel to the wires of said radially disposed windings 17 at the periphery of the toroidal coil thereof, the outer edges 26 of these projecting portions 18 are provided with a smooth curved configuration so that they do not offer resistance to the placement windings on the core and will not damage the insulation on the windings in the event the windings touch these edges 26 while being wound on the core 12. It will be seen that the projecting portions 18 are provided with openings 28 disposed to receive screws 30 which hold the projections 18 in conductive relationship with the supports or heat conductors 24.

As shown in FIG. 1 there are four strips 16 each having a projection 18 extending beyond the periphery of the windings. However, additional strips 16 may be provided, for example, eight such strips may be utilized if desired and correspondingly the arcuate sections contiguous with the core 12 will be shorter.

The disposition of the strips 16 between the core 12 and the windings 17 permits heat to flow from the core and the windings outwardly through the extending portions 18. This removes heat from the interior of the electromagnetic structures thereby permitting them to be smaller in proportion to their capacity or permits them to be less efficient for a given over all size thereof.

Figure 2:
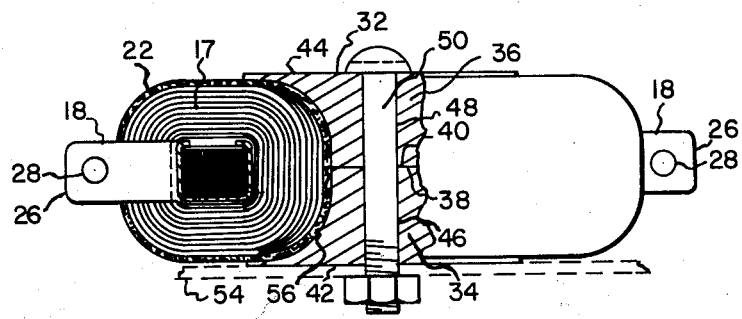
FIG. 2 is a sectional view taken from the line 2—2 of FIG. 1.

An additional heat exchange means of the invention comprises a spool member 32 which is disposed in the center of the toroidal windings and concentric with the toroidal core 12. This spool 32 is preferably made of heat conductive material such as aluminum or copper or any equivalent thereof. The spool 32 is composed of two sections 34 and 36 having small diameter ends 38 and 40, respectively, which are disposed adjacent to each other at the middle portion of the electromagnetic device as shown in FIG. 2 of the drawings. These spool members 34 and 36 are annular in cross section and are provided with enlarged diameter ends 42 and 44 opposite the ends 38 and 40, respectively. Thus, the cross section of each spool member 34 and 36 flares from its inner end to its outer end and the curvature of the flare of each spool substantially conforms to the curvature adjacent to the center of the toroidal windings. The spool members 34 and 36 are provided with internally screw-threaded bore portions 46 and 48, respectively, in which a bolt 50 is screw-threaded. The bolt 50 may be projected through a suitable support 54 which may also act as a heat conductor to transfer heat from the electromagnetic device. The spool members 34 and 36 are thermally coupled to the windings 17 by mastic 56 which may be composed of metal particles and a resin. Thus, during production of the electromagnetic device shown in FIG. 2 of the drawings the thermally conductive mastic is placed on the windings adjacent the center thereof and the spools 34 and 36 are screw-threadedly coupled to the bolt 50 and threaded into place into intimate contact with the mastic 56. The coating 22 may be subsequently placed on the outer surface of the windings and the ends 42 and 44 of the spool members 34 and 36 remain bare so that they may serve as heat conductive surfaces.

In operation the heat exchange means of the present invention comprising the strips 16 and the spool 32 composed of the spool members 34 and 36 serve to dissipate heat from the toroidal electromagnetic device shown or from any equivalent device. In the specific embodiment the projecting ends 18 of the strips 16 are coupled to supports 24 or heat sink devices which conduct heat away from the projecting portions 18 of the strips 16. Additionally, the plate or support 54 coupled to the spool members 34 and 36 carries heat away from the center of the electromagnetic device.

It will be appreciated that the strips 16 interposed between the windings and the core of the device shown in FIG. 1 operate efficiently to remove heat directly from a critical area of the device. It will be appreciated that insulation and the coating 22 offer considerable thermal inertia to the exchange of heat from an area around the core 12 and inwardly of the windings 17. The strips 16 being of aluminum or copper or other equivalent material very rapidly remove heat from several paths to the exterior of the windings 20 and while these strips at their portions 18 may serve as supports for the electromagnetic device they also are thermally coupled to the elements 24 which rapidly carry the heat away from the electromagnetic device. Additionally, the plate 54 coupled to the spools 34 and 36 dissipates heat from the middle portion of the electromagnetic device.

It will be understood by those skilled in the art that the heat exchange means of the present invention prevents a substantial temperature rise in the structures of electromagnetic devices whereby the amplitude of the expansion differential attained during each cycle of operation of the device is nominal whereby the stress on insulation of the windings is nominal all of which results in longevity of the magnetic device in which the heat exchange means of the invention is employed. Additionally, it will be appreciated that due to the capacity of the heat exchange means of the invention to remove heat from such electromagnetic devices that these devices may be of a less efficient design in proportion to the over-all size thereof and/or the capacity thereof. Additionally, it will be appreciated that the heat exchange means of the invention will permit the building of smaller electromagnetic devices in proportion to their power capacity.

Figure 3:
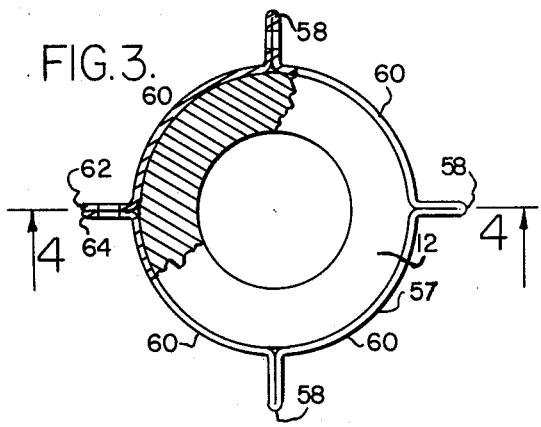
FIG. 3 is a side elevational view of a modification of the invention showing a toroidal core and heat exchange means of the present invention in contiguous relation therewith and showing the windings of the electromagnetic device omitted.

In the modification as shown in FIG. 3 of the drawings a heat exchange strip 57 surrounds the core 12. This strip is a continuous strip having folded loop portions 58 and intermediate portions 60 contiguous to the core and similar to the strips 16. The folded portions 58 extend radially in a similar manner to the section 18 of the strip 16. However, it will be seen that these folded portions 58 comprise twice the cross-sectional area of the extending portions 18 and therefore have much greater heat conducting capacity.

It will be appreciated that the folded portions 58 may be the equivalent of the strips 16 having a radial projection 18 at each end thereof. This construction is partly embodied in the strip 57, the opposite ends 62 and 64 of which are abutted to each other but do not comprise integral folded structure common to the remaining projections 58.

It will be obvious to those skilled in the art that the heat exchange strip 57 may be a single piece unit as shown in FIG. 3 or that the construction of such a heat exchange means may comprise four sections similar to the strips 16 but having a projection 18 at each end thereof which extend outwardly beyond the winding 17.

It will be understood that the windings are omitted from the disclosure of FIG. 3 in order to simplify the illustration.

Figure 5:
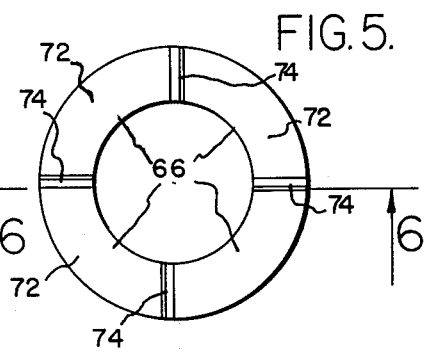
FIG. 5 is a side elevational view of a further modified heat exchange means of the invention disposed in contiguous relationship with a toroidal core and showing the windings omitted.
Figure 4:
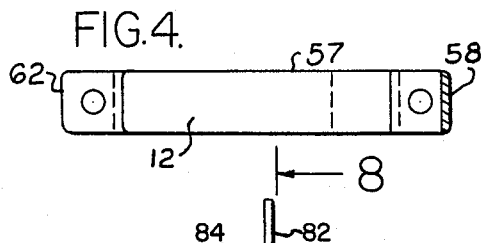
FIG. 4 is a sectional view taken from the line 4—4 of FIG. 3.
Figure 6:
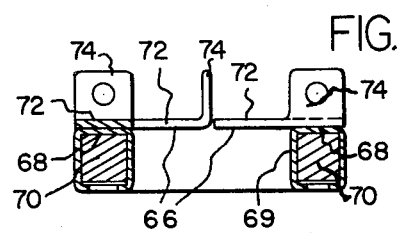
FIG. 6 is a sectional view taken from the line 6—6 of FIG. 5.

In the modification as shown in FIGS. 5 and 6 of the drawings, a plurality of heat exchange strips 66 are conductively contiguous with a closed side 68 of a metallic core box 69. These strips 66 are provided with arcuate portions 72 which engage one axial end of the core box 69 and are provided with axially extending projections 74 which are disposed to project beyond the windings not shown, such windings would surround the strips 72 and permit the extension of the projecting portions 74 axially beyond the extremities of the windings. The projecting portions 74 may be connected to means for dissipating heat and may also serve as a mount for the electromagnetic device comprising the core 70 and windings, not shown, surrounding the core and the strips 72.

The configuration of the heat exchange means shown in FIGS. 5 and 6 may be particularly adapted to an axial mounting of a toroidal device and may serve as a more compact heat exchange structure where the diameter of the device is a critical consideration.

Figure 7:
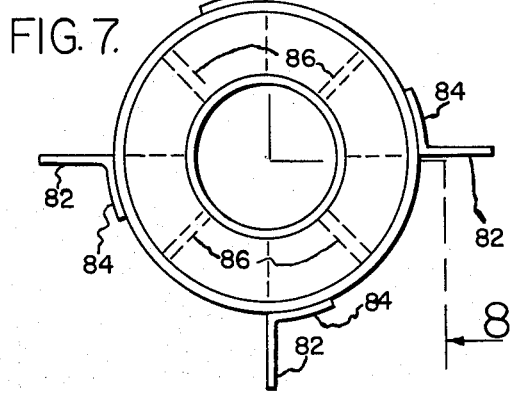
FIG. 7 is a side elevational view of a further modified form of the heat exchange means of the invention shown coupled directly to a core box of a toroidal core and showing the windings omitted.
Figure 8:
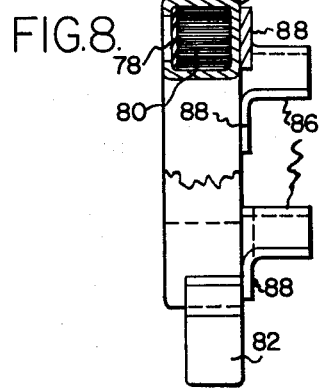
FIG. 8 is a sectional view taken from the line 8—8 of FIG. 7.

As shown in FIGS. 7 and 8 of the drawings, a modified heat exchange means of the invention is coupled directly to a conventional core box surrounding a toroidal core. Conventional toroidal cores as shown in FIG. 8 of the drawings comprise an annular channel shaped core box 76 which may be constructed of aluminum or any other thermally conductive material. The open side of such channel shaped in cross section annular core boxes are enclosed by an annular flat ring of suitable insulating material 78.

The core structure 80 is contained in the annular channel shaped cross section core box and the heat exchange means of the present invention comprises radially extending heat exchange clips 82 which are provided with angularly disposed portions 84 which conform with and are spot welded to the periphery of the core box 76. It will be understood that while the spot welding is preferred that any fusion process may be employed such as furnace brazing or the like in a case where copper or other suitable alloys are utilized which may be compatible with such a process.

Additionally, axially extending heat exchange clips 86 are provided with angular portions 88 spot welded or otherwise fused to the closed end of the core box 76 and these clips 86 extend axially of the core box.

It will be appreciated that the planes of all of the clips 82 and 86 are radially disposed as shown in FIG. 7 so that toroidal windings may be placed around the core box and the clips permitting the clips 82 and 86 to extend neatly between the radial winding and to project beyond the peripheral extremities of the windings when in position as shown in FIG. 1 of the drawings.

Figure 9:
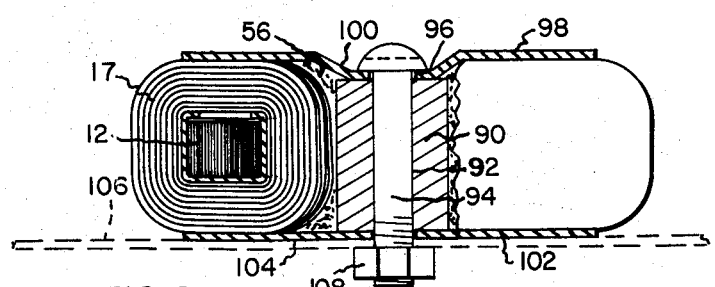
FIG. 9 is an axial sectional view of a toroidal electromagnetic device showing a further modified heat exchange means of the invention in connection therewith.

In the modification as shown in FIG. 9 of the drawings a toroidal core 12 is surrounded by windings 17 and a cylindrical shaped spool 90 of heat conducting material is disposed in the center of the toroidal windings. This spool is provided with a bore 92 through which a bolt 94 extends. This bolt 94 extends through an opening 96 in a heat exchange plate 98. This plate 98 is generally recessed around the hole 96 and tends to fit in conformance with the recess at the center of the toroidal windings on one side of the electromagnetic device. The recess portion 100 of the plate 98 is concentric with the toroidal structure of the electromagnetic device and tends to retain the mastic 56 in intimate contact with the spool 90 and the center of the toroidal windings during the curing process of such material.

It will be seen that the bolt 94 extends through another plate 102 at the opposite side of the toroidal windings. This plate 102 also intimately contacts the mastic 56 and tends to retain the same during the curing process thereon. The plate 102 also acts as a heat transfer device and is provided with a bare surface 104 which is clamped against a surface 106 by means of a nut 108. The surface 106 may be the upper surface of a heat conducting member which also serves as a mount for the electromagnetic device shown in FIG. 9 of the drawings.

It will be obvious to those skilled in the art that various modifications of the invention may be resorted to in a manner limited only by a just interpretation of the following claims.

I claim:

1. In a heat exchange means for electromagnetic devices the combination of: a ring shaped toroidal core member; toroidal coil windings helically surrounding said core member; and non-magnetic thermally conductive elements disposed contiguous to and between said windings and said core member and extending outwardly between and beyond said windings to conduct heat away from said windings and said core; opposite sides of said thermally conductive elements substantially parallel to said toroidal coil windings at the periphery thereof; a thermally conductive spool disposed concentrically of said windings on said core member; and heat conductive mastic intimately disposed between said windings and said spool to conduct heat from said windings to said spool.

2. In a heat exchange means for electromagnetic devices the combination of: a ring shaped toroidal core member; toroidal coil windings helically surrounding said core member; and non-magnetic thermally conductive elements disposed contiguous to and between said windings and said core member and extending outwardly between and beyond said windings to conduct heat away from said windings and said core; opposite sides of said thermally conductive elements substantially parallel to said toroidal coil windings at the periphery thereof; a thermally conductive spool disposed concentrically of said windings on said core member; and heat conductive mastic intimately disposed between said windings and said spool to conduct heat from said windings to said spool; said spool being constructed of two flared spool sections having enlarged diameter heat conductive surfaces disposed axially at the end of said toroidal coil windings.

3. In a heat exchange means for electromagnetic devices the combination of: a ring shaped toroidal core member; toroidal coil windings helically surrounding said core member; and non-magnetic thermally conductive elements disposed contiguous to and between said windings and said core member and extending outwardly between and beyond said windings to conduct heat away from said windings and said core; opposite sides of said thermally conductive elements substantially parallel to said toroidal coil windings at the periphery thereof; a thermally conductive spool disposed concentrically of said windings on said core member; and heat conductive mastic intimately disposed between said windings and said spool to conduct heat from said windings to said spool; said spool being constructed of two flared spool sections having enlarged diameter heat conductive surfaces disposed axially at the end of said toroidal coil windings; and a bolt extending through said spool and adapted to couple said spool to a thermally conductive member.

4. In a heat exchange means for electromagnetic devices the combination of: a ring shaped toroidal core member; toroidal coil windings helically surrounding said core member; and flat thermally conductive elements having sections engaging the outer side of said core member and disposed contiguous to and between said windings and said core member; said thermally conductive elements having flat sides extending radially through and between said windings; said sides disposed substantially parallel with the axis of said toroidal core member and said windings at the periphery of said toroidal coil windings, said thermally conductive elements extending outwardly beyond said windings to conduct heat away from said windings and said core member; a thermally conductive spool disposed concentrically of said windings and said core member; heat conductive mastic intimately disposed between said windings and said spool to conduct heat from said windings to said spool; and means for coupling said spool to a structure for dissipating heat from said spool to said structure.

References Cited by the Examiner

UNITED STATES PATENTS

| | | | |
|---|---|---|---|
| 2,769,962 | 11/56 | Melville | 336—61 |
| 2,770,785 | 11/56 | Haagens | 336—61 |
| 2,788,499 | 4/57 | Pappas | 336—61 X |
| 2,850,687 | 9/58 | Hammes | 174—52 |
| 2,946,973 | 7/60 | Lufcy | 336—213 |

OTHER REFERENCES

German printed application R 8,189, October 18, 1956.

LARAMIE E. ASKIN, *Primary Examiner.*

MILTON O. HIRSHFIELD, JOHN P. WILDMAN, JOHN F. BURNS, *Examiners.*